United States Patent
Ni et al.

(10) Patent No.: US 10,460,008 B2
(45) Date of Patent: Oct. 29, 2019

(54) PREDICTING SYSTEM TRAJECTORIES TOWARD CRITICAL TRANSITIONS

(71) Applicant: HRL Laboratories, LLC, Malibu, CA (US)

(72) Inventors: Kang-Yu Ni, Calabasas, CA (US); Tsai-Ching Lu, Wynnewood, PA (US)

(73) Assignee: HRL Laboratories, LLC, Malibu, CA (US)

( * ) Notice: Subject to any disclaimer, the term of this patent is extended or adjusted under 35 U.S.C. 154(b) by 364 days.

(21) Appl. No.: 14/209,314

(22) Filed: Mar. 13, 2014

(65) Prior Publication Data
US 2017/0308505 A1 Oct. 26, 2017

Related U.S. Application Data

(63) Continuation-in-part of application No. 13/904,945, filed on May 29, 2013, now abandoned.

(60) Provisional application No. 61/784,167, filed on Mar. 14, 2013.

(51) Int. Cl.
G06F 17/14 (2006.01)
(52) U.S. Cl.
CPC .................... *G06F 17/14* (2013.01)
(58) Field of Classification Search
CPC .............................. G06F 17/14; G06Q 10/04
USPC .......................................................... 702/183
See application file for complete search history.

(56) References Cited

U.S. PATENT DOCUMENTS

| | | | |
|---|---|---|---|
| 3,688,255 A * | 8/1972 | Klein | B60T 8/885 200/81.4 |
| 6,448,888 B1 * | 9/2002 | Horner | G08B 21/12 180/271 |
| 6,865,509 B1 | 3/2005 | Hsiung et al. | |

(Continued)

FOREIGN PATENT DOCUMENTS

| | | |
|---|---|---|
| EP | 2535000 | 12/2012 |
| JP | 2010-061450 | 3/2010 |

OTHER PUBLICATIONS

Wang, Chaoili, "Analyzing information transfer in time-varying multivariate data". 2011 IEEE Pacific Visualization, Mar. 1, 2011 Symposium, pp. 99-106.*

(Continued)

*Primary Examiner* — Yoshihisa Ishizuka
(74) *Attorney, Agent, or Firm* — Tope-McKay & Associates

(57) ABSTRACT

Described is a system for predicting system trajectories toward critical transitions. The system transforms a set of multivariate time series of observables of a complex system into a set of symbolic multivariate time series. Then pair-wise time series of a transfer entropy (TE) measure are determined, wherein the TE measure quantifies the amount of information transfer from a source to a destination in the complex system. An associative transfer entropy (ATE) measure is determined which decomposes the pair-wise time series of TE to associative states of asymmetric, directional information flows, wherein the ATE measure is comprised of an ATE+ influence class and a ATE− influence class. The system estimates ATE+, TE, and ATE− trajectories over time, and at least one of the ATE+, TE, and ATE− trajectories is used to predict a critical transition in the complex system.

16 Claims, 8 Drawing Sheets

(56) References Cited

U.S. PATENT DOCUMENTS

| | | | | |
|---|---|---|---|---|
| 2002/0000787 A1* | 1/2002 | Minamiura | ........... | H02J 7/0088 |
| | | | | 320/125 |
| 2002/0140550 A1* | 10/2002 | Frattaroli | ................ | B60R 25/10 |
| | | | | 340/426.1 |
| 2010/0123465 A1* | 5/2010 | Owens | ................. | G01R 31/026 |
| | | | | 324/503 |
| 2010/0277123 A1* | 11/2010 | Lim | ...................... | H02J 7/0014 |
| | | | | 320/116 |
| 2010/0324376 A1* | 12/2010 | Chinnadurai | ......... | G06Q 50/22 |
| | | | | 600/300 |
| 2012/0212176 A1* | 8/2012 | Park | ..................... | B60L 3/0046 |
| | | | | 320/107 |

OTHER PUBLICATIONS

Wolfram, "https://web.archive.org/web/20100515094202/http://mathworld.wolfram.com/LeastSquaresFittingLogarithmic.html", Wayback Machine, Least Squares Fitting-Logarithmic. May 15, 2010.*

Wikipedia-Derivative, "https://web.archive.org/web/20110302203056/http://en.wikipedia.org/wiki/Derivative", Wayback Machine Derivative Wikipedia, Mar. 2, 2011.*

Wikipedia-Finite-Difference-Method, "https://web.archive.org/web/20100331172231/http://en.wikipedia.org/wiki/Finite_difference_method", Wayback Machine Finite Difference Method Wikipedia, Mar. 31, 2010.*

Wikipedia-Least-Squares., "https://web.archive.org/web/20110304153506/http://en.wikipedia.org/wiki/Least_squares", Wayback Machine Least-Squares Wikipedia, Mar. 4, 2011.*

G. Holland and N. Vaidya, "Analysis of TCP performance over mobile ad hoc networks," in Proceedings of the 5th annual ACM/IEEE International conference on Mobile computing and networking, ser. MobiCom '99. New York, NY, USA: ACM, 1999, pp. 219-230. [Online], http://doi.acm.org/10.1145/313451.313540.

Y.-Y. Liu, et al., "Controllability of complex networks," Nature, vol. 473, pp. 167-173, 2011.

Yang-Yu Liua, Jean-Jacques Slotinef, and Albert László Barabásia, "The observability of complex systems," PNAS, vol. 110, No. 7, pp. 2460-2465, 2013.

K.Y. Ni and T.-C. Lu, "Information dynamic spectrum predict critical transitions," in Proceedings of the 2nd International Conference on Complex Sciences: Theory and Applications (COMPLEX 2012), Santa Fe, New Mexico, Dec. 2012, pp. 267-280.

A. Josang, "An algebra for assessing trust in certification chains," in J. Kochmar, editor, Proceedings of the network and Distributed Systems Security Symposium (NDSS '99). The Internet Society, 1999.

C. Nicolaides, L. Cueto-Felgueroso, M. C. González, and R. Juanes, "A metric of influential spreading during contagion dynamics through the air transportation network," PLOS one, vol. 7, No. 7, E40961, 2012.

J.-P. Hubaux, L. Buttyán, and S. Capkun, "The quest for security in mobile ad hoc netoworks," in Proceedings of the 2nd ACM International symposium on Mobile ad hoc networking & computing. ACM, 2001, pp. 146-155.

S. Marti, T. J. Giuli, K. Lai, M. Baker et al., "Mitigating routing misbehavior in mobile ad hoc networks," in International Conference on Mobile Computing and Networking: Proceedings of the 6 th annual international conference on Mobile computing and networking, vol. 6, No. 11, 2000, pp. 255-265.

H. Yang, J. Shu, X. Meng, and S. Lu, "Scan: self-organized network-layer security in mobile ad hoc networks," Selected Areas in Communications, IEEE Journal on, vol. 24, No. 2, pp. 261-273, 2006.

Y. Zhang, et al., "Security in mobile ad-hoc networks," in Ad Hoc Networks, Springer, 2005, pp. 249-268.

K. Govindan and P. Mohapatra, "Trust computations and trust dynamics in mobile adhoc networks: a survey," Communications Surveys & Tutorials, IEEE, vol. 14, No. 2, pp. 279-298, 2012.

A. Jøsang, R. Ismail, and C. Boyd, "A survey of trust and reputation systems for online service provision," Decision support systems, vol. 43, No. 2, pp. 618-644, 2007.

P. Michiardi, et al., "Core: a collaborative reputation mechanism to enforce node cooperation in mobile ad hoc networks," in Proceedings of the IFIP TC6/TC11 Sixth Joint Working Conference on Communications and Multimedia Security: Advanced Communications and Multimedia Security, 2002, pp. 107-121.

S. Noel, et al., "Advances in topological vulnerability analysis," in Conference For Homeland Security, 2009. CATCH'09. Cybersecurity Applications & Technology, IEEE. 2009, pp. 124-129.

T. Karagiannis, K. Papagiannaki, and M. Faloutsos, "Blinc: multi-level traffic classification in the dark," in ACM SIGCOMM Computer Communication Review, vol. 35, No. 4 ACM, 2005, pp. 229-240.

S. Noel and S. Jajodia, "Understanding complex network attack graphs through clustered adjacency matrices," in Computer Security Applications Conference, 21st Annual. IEEE, 2005, pp. 1-10.

M. Kurant, et al., "Layered complex networks," Physical review letters, vol. 96, No. 13, pp. 138701-1-138701-4, 2006.

S. V. Buldyrev, R. Parshani, G. P. H. E. Stanley, and S. Havlin, "Catastrophic cascade of failures in interdependent networks," Nature, vol. 464, No. 7291, pp. 1025-1028, 2010.

Extendable Mobile Ad-hoc Network Emulator (EMANE). Naval Research Laboratory, Networks and Comm. Systems Branch. [Online] http://cs.itd.nrl.navy.mil/work/emane/, taken on Jan. 26, 2015.

J. Gao, et al., "Networks formed from interdependent networks," Nature Physics, vol. 8, No. 1, pp. 40-48, 2011.

K. E. Defrawy and G. Tsudik, "Anonymous location aided routing in suspicious MANETs," IEEE Transactions on Mobile Computing (IEEE TMC), vol. 10, No. 9,pp. 1345-1358, Sep. 2011.

Y. Kong, "Resilience to degree-dependent and cascading node failures in random geometric networks," IEEE Transactions on Information Theory, vol. 56, No. 11, pp. 5533-5546, 2010.

NS-3 discrete-event network simulator. [Online] http://www.nsnam.org/ , taken Feb. 2015.

N. C. Valler, B. A. Prakash, H. Tong, M. Faloutsos, and C. Faloutsos, "Epidemic spread in mobile ad hoc networks: determining the tipping point," in Proceedings of the 10th international IFIP TC 6 conference on Networking—vol. Part I, ser. NETWORKING'11, Berlin, Heidelberg: Springer-Verlag, 2011, pp. 266-280, [Online] http://dl.acm.org/citation.cfm?id=2008780.2008807.

PCT International Search Report and the Written Opinion of the International Searching Authority for PCT/US2014/026469, dated Jul. 25, 2014.

Lungarella, et al., "Information transfer at multiple scales," Physical Review E, No. 76, pp. 1-10, Nov. 27, 2007.

Lindner, et al., "TRENTOOL: A Mat lab open source toolbox to analyse information flow in time series data with transfer entropy," BMC Neuroscience, pp. 1-22, Nov. 18, 2011.

Runge, et al., "Quantifying causal coupling strength: A lag-specific measure for multivariate time series related to transfer entropy," Physical Review E. pp. 1-15, Nov. 21, 2012.

H. Moon and T.-C. Lu, Early Warning Signal of Complex Systems: Network Spectrum and Critical Transitions, WIN (2010).

H. Moon and T.-C. Lu, Network Catastrophe: Self-Organized Patterns Reveal both the Instability and the Structure of Complex Networks, preprint, (2012).

M. Scheffer, J. Bascompte, W.A. Brock, V. Brovkin, S.R. Carpenter, V. Dakos, H. Held, E.H. van Nes, M. Rielkerk, and G. Sugihara, Early-warning signals for critical transitions. Nature, 461, (2009).

CERT US Secret Service and Deloitte. 2010 cybersecurity watch survey. CSO magazine, 2010.

David Allen, Tsai-Ching Lu, and David Huber. Detecting and analyzing relationships among anomalies. In IEEE VAST, 2009.

Michael McCormick Data theft: a prototypical insider threat. In S. Stolfo et al. (Ed.), Insider Attack end Cyber Security, pp. 53-680, Springer, 2008.

2006 E-Crime Watch Survey CSO Magazine with U.S. Secret Service, CERT Coordination Center, and Microsoft Corp.

(56) References Cited

OTHER PUBLICATIONS

Brian Bowen, Malek Ben Salem, Shlomo Hershkop, Angelos Keromytis, Salvatore Stolfo, Designing Host and Network Sensors to Mitigate the Insider Threat. IEEE Security and Privacy, pp. 22-29, Nov./Dec. 2009.
Robert H. Anderson, Thomas Bozek, Tom Longstaff, Wayne Meitzler. Michael Skroch, and Ken Van Wyk. Research on mitigating the insider threat to information systems—#2, RAND Conference Proceedings, 2000.
D. Caputo, M. Maloof, and G. Stephens. Detecting the theft of trade secrets by insiders: a summary MITRE insider threat research. IEEE Security & Privacy, Fall 2009.
Felicia Duran, Stephen H. Conrad, Gregory N. Conrad, David P. Duggan, and Edward Bruce Held. Building a system for insider security. IEEE Security and Privacy, pp. 30-38, Nov./Dec. 2009.
M. Keeney, E. Kowalski, D/ Cappelli, A. Moore, T. Shimeall, and S. Rogers. Insider threat study: computer system sabotage in critical infrastructure sectors. Joint SEI and U.S Secret Service Report, 2005.
Adam Barth, Benjamin Rubinstein, Mukund Sundararajan, John Mitchell. Dawn Song, and Peter Bartlett. A learning-based approach to reactive security. In Proc. of the 14th International Conference on Financial Cryptography and Data Security, 2010.
Ya'akov Gal and Avi Pfeffer. Networks of influence diagrams: a formalism for reasoning about agents' decision-raking processes. Journal of Artificial Intelligence Research 33, pp. 109-147, 2008.
Gérard Wegener, Radu State, Alexandre Dulaunoy, and Thomas Engel. Self adaptive high interaction honeypots driven by game theory, In SSS '09: Proceedings of the 11th International Symposium on Stabilization, Safety, and Security of Distributed Systems, pp. 741-755, Berlin, Heidelberg, 2009. Springer-Verlag.
Changhe Yuan. Xiaolu Liu, Tsai-Ching Lu, and Heejin Lim. Most relevant explanation: Properties, algorithms, and evaluations. In Proceeding of the 25th Conference on Uncertainty in Artificial Intelligence (UAI 2009), 2009.
Aaron Clauset, Cristopher Moore, and M. E J. Newnan Hierarchical structure and the prediction of missing links in networks. Nature, 453 (7191): 98-101, 2008.
B. Davison and H. Hirsh. Predicting Sequences of User Actions. AAAI-98 Workshop, 1998.
Steven McKinney. Insider threat: user identification via process profiling. Ph.D. thesis, NCSU, 2008.
N. Nguyen, P. Reiher, and G.H. Kuenning. Detecting insider threats by monitoring system call activity. IEEE Information Assurance Workshop, United States Military Academy West Point, New York, 2003.
Malek Ben Salem, Shlomo Hershkop, and Salvatore Stolof, A Survey of insider Attack Detection Research. In S. Stolfo et al. (Ed.), Insider Attack and Cyber Security, pp. 69-90. Springer, 2008.
Mikhail Belkin and Partha Niyogi. Laplacian Eigenmaps for dimensionality e i ion and data representation. In Neural Computation, vol. 15, 2003.
N. Marwan, M.C. Romano, M. Thiel, and J. Kurths. Recurrence plots for the analysis of complex systems. In Physics Reports, 438, 237-329.
Malek Ben Salem and Salvatore Stolfo. Detecting Masqueraders. A Comparison of One-Class Bag-of-Words User Behavior Modeling Techniques. In Proceedings of the Second International Workshop on Managing Insider Security Threats, 2010.
M. Stheffer, J. Bascompte, W.A. Brock, V. Brovkin, S.R. Carpenter, V. Dakos, H. Held, E.H. van Nes, M. Rietkerk, and G. Sugihara. Early-warning signals for critical transitions. Nature, 461: 53-59, 2009.
O. Kwon and J.-S. Yang, Information Flow between Stock Indices, 2008 EPL 82 68003.
M. Staniek and K. Lehnertz, Symbolic Transfer Entropy, Physical Review Letters 100, 15801, 2008.
M. Scheffer, J. Bascompte, W.A. Brock, V. Brovkin, S.R. Carpenter, V. Dakos, H. Held, E.H. van Nes, M. Rietkerk, and G. Sugihara, Early-warning signals for critical transitions, Nature, 461, 2009.
T. Schreiber, Measuring Information Transfer, Phys. Rev. Lett. 85, 461, 2000.
K.-Y. Ni and T.-C. Lu, Detection and Identification of Directional Infuences using Information Dynamic Spectrum, Proceedings of the 4th Workshop on Information in Networks, 2012.
D. Cappelli, R. Trzeciak, and R. Floodeen. "The Key to Successful Monitoring for Detection of Insider Attacks," presented at RSA Conference 2010, Mar. 2010.
2910 CyberSecurity Watch Survey, www.cert.org/archive/pdf/ecrimesummary10.pdf.
T. Kolda and B. Bader. "Tensor Decompositions and Applications," in SIAM Review, Jun. 2008.
J. Sun, D. Tao, S. Papadimitriou, P. Yu, and C. Faloutsos, "Incremental Tensor Analysis: Theory and Applications," in ACM Transactions on Knowledge Discovery from Data, vol. 2, No. 3, Oct. 2008.
National Research Council. "Network Science." The National Academies Press, 2005.
Charles Pfleeger, Reflections on the Insider Threat. In. S. Stolfo et al. (Ed.), Insider Attack and Cyber Security, pp. 5-15, Springer, 2008.
Michael McCormick. Data theft: a prototypical insider threat. In S. Stolfo et al. (Ed.), Insider Attack and Cyber Security, pp. 53-68. Springer, 2008.
M. Scheffer, J Bascompte, W.A. Brock, V. Brovkin, S.R. Carpenter, V. Dakos, H. Held, E.H. van Nes, M. Rietkerk & G. Sugihara, Early-warning signals for critical transitions. Nature, 461: 53-59, 2009.
V. Dakos, E. H. van Nes, R. Donangelo, H. Fort, and M. Scheffer (in press). Spatial ratio as leading indicator of catastrophic shifts. Theoretical Ecology, 2009.
J. A. Almendral and A. Diaz-Guilera, Dynamical and spectral properties of complex networks, New J. Phys. 9 187, 2007.
V. Guttal and C. Jayaprakash, Spatial variance and spatial skewness: leading indicators of regime shifts in spatial ecological systems, Theoretical Ecology, 2009.
P. N. McGraw and M. Menzinger, Analysis of nonlinear synchronization dynamics of oscillator networks by Laplacian spectral methods, Physical Review E 75. 2007.
L.M. Pecora and T.L. Carroll, Master ability Functions for Synchronized Coupled Systems, Phys. Rev. Lett. 1998.
D. Harmon, M De Aguitar, D. Chinellato, D. Braha, R.R. Epstein, and Y. Bar-Yam, Predicting economic market crises using measures of collective panic, Arxiv.org, 2011.
Hankyu Moon and Tsai-Ching Lu. Early warning signal of complex systems: Network spectrum and critical transitions. In Workshop on Information in Networks (WIN), 2010.
H. Moon and T.-C. Lu, Network Catastrophe: If-Organized Patterns Reveal both the Instability and the Structure of Complex Networks, preprint, 2012.
Office Action 1 for U.S. Appl. No. 13/904,945, dated Oct. 7, 2016.
Wang, Chaoili, "Analyzing information transfer in time-varying multivarate data". 2011 IEEE Pacific Visualization, Mar. 1-4, 2011 Symposium, pp. 99-106.
Zennaro, Marino. "Stability of linear problems: joint spectral radius of matrices"., Lecture 1, CIME-EMS Summer School in Applied Mathematics Jun. 27-Jul. 2, 2011—Cetraro (CS), Italy.
Response to Office Action 1 for U.S. Appl. No. 13/904,945, dated Jan. 9, 2017.
Office Action 2 for U.S. Appl. No. 13/904,945, dated May 5, 2017.
Response to Office Action 2 for U.S. Appl. No. 13/904,945, dated Jul. 26, 2017.
Office Action 3 for U.S. Appl. No. 13/904,945, dated Sep. 21, 2017.
Chinese Patent CN105122004B, granted Nov. 28, 2017.
Supplementary European Search Report for European Regional Phase Patent Application No. 14775044.2, dated Jun. 22, 2016.
Response to European Search Report for European Regional Phase Patent Application No. 14775044.2, dated May 10, 2017.
Response to Office Action 3 for U.S. Appl. No. 13/904,945, dated Dec. 20, 2017.
Office Action 4 for U.S. Appl. No. 13/904,945, dated May 10, 2018.

(56) References Cited

OTHER PUBLICATIONS

Notification Concerning Transmittal of International Preliminary Report on Patentability for PCT/US2014/026469; dated Sep. 24, 2015.
International Preliminary Report on Patentability for PCT/US2014/026469; dated Sep. 24, 2015.
First Examination Report for European Regional Phase Patent Application No. 14775044.2, dated Apr. 17, 2018.
Response to first Examination Report for European Regional Phase Patent Application No. 14775044.2, dated Jan. 31, 2019.

\* cited by examiner

PREDICTING SYSTEM TRAJECTORIES TOWARD CRITICAL TRANSITIONS

CROSS-REFERENCE TO RELATED APPLICATIONS

This is a Continuation-in-Part application of U.S. Non-Provisional application Ser. No. 13/904,945, filed in the United States on May 29, 2013, entitled, "Detection and Identification of Directional Influences Using Dynamic Spectrum." This is also a Non-Provisional patent application of U.S. Provisional Application No. 61/784,167, filed in the United States on Mar. 14, 2013, entitled, "Predict System Trajectories Toward Critical Transitions."

FIELD OF INVENTION

The present invention relates to system for automated detection of critical transitions and, more particularly, to a system for automated detection of critical transitions using predicted system trajectories.

BACKGROUND OF INVENTION

One central characteristic of complex social-technological systems is their self-organized emerging interactions which provide the benefits of exchanging information and resources effectively, yet at the same time increases the risk and pace of spreading attacks or failures. A small perturbation on a complex system operating in a high-risk unstable region can induce a critical transition that leads to unstoppable catastrophic failures.

There are a few recent works of early warning signals for heterogeneously networked dynamical systems. Kwon and Yang (see the List of Incorporated Cited Literature References, Literature Reference No. 1) use transfer entropy to analyze financial market data. They calculate pair-wise transfer entropy to form a transfer entropy matrix and demonstrate the asymmetrical influence from mature markets to emerging markets using transfer entropy. Their method estimates global transfer entropy, not local transfer entropy changing in time; therefore, their method cannot handle dynamics and structure changes in directional influence.

Staniek and Lehnertz (see Literature Reference No. 4) introduced a robust and computationally efficient method to estimate transfer entropy using a symbolization technique. Their demonstration of symbolic transfer entropy (STE) on brain electrical activity data shows STE is able to detect the asymmetric dependences and identify the hemisphere containing the epileptic focus without observing actual seizure activity. However, their emphasis is also not on identifying the dynamics of the complex system structure.

Scheffer et al. (see Literature Reference No. 5) surveys state-of-the-art methods that originated in the ecological domain. These methods focus only on homogeneous lattices with signals such as increased temporal correlation, skewness, and spatial correlations of the population dynamics, thus are not able to deal with heterogeneously networked dynamical systems.

Moon and Lu (see Literature References No. 2 and 3) developed a spectral early warning signals (EWS) theory that detects the approaching of critical transitions and can estimate the system structure and network connectivity near critical transitions using the covariance matrix. Although spectral EWS quantifies how much entities of a system are moving together, the symmetric nature of covariance spectrum does not permit the analysis of directional influences among entities.

Thus, a continuing need exists for a system for automated detection of critical transitions in heterogeneously networked dynamical system using an information dynamic spectrum framework that permits analysis of directional influences among entities.

SUMMARY OF INVENTION

The present invention relates to system for predicting system trajectories toward critical transitions. The system comprises one or more processors and a memory having instructions such that when the instructions are executed, the one or more processors perform multiple operations. A set of multivariate time series of observables of a complex system is transformed into a set of symbolic multivariate time series. Pair-wise series of a transfer entropy (TE) measure are determined. An associative transfer entropy (ATE) measure is determined. The ATE measure is comprised of an ATE+ positive influence class and an ATE− negative influence class. Then, ATE+, TE, and ATE− trajectories are estimated over time. Finally, a critical transition in the complex system is predicted using at least one of the ATE+, TE, and ATE− trajectories.

In another aspect, the system estimates the TE trajectory by the natural logarithm (ln) with an unknown coefficient a and a constant c according to the following:

$$g(t) = a \ln(t) + c,$$

where t represents time.

In another aspect, the system estimates the unknown coefficient a with various discrete time steps by taking the derivative of $g(t) = a \ln(t) + c$ to obtain $$g'(t) = \frac{a}{t},$$

then obtaining a discretized version of the unknown coefficient a according to the following:

$$\frac{\Delta g}{\Delta t} = a \frac{1}{t}.$$

In another aspect, the system determines the unknown coefficient a according to the following:

for a fixed timestep $\Delta t$ in a window $[T_{start}, T_{end}]$, determining the following matrix equation:

$$\begin{bmatrix} \frac{1}{t_1 + \Delta t/2} \\ \frac{1}{t_2 + \Delta t/2} \\ \vdots \\ \frac{1}{t_k + \Delta t/2} \end{bmatrix} a = \begin{bmatrix} \frac{g(t_1 + \Delta t) - g(t_1)}{\Delta t} \\ \frac{g(t_2 + \Delta t) - g(t_2)}{\Delta t} \\ \vdots \\ \frac{g(t_k + \Delta t) - g(t_k)}{\Delta t} \end{bmatrix},$$

where $t_1, \ldots, t_k + \Delta t \in [T_{start}, T_{end}]$; and determining an approximation of $a_{\Delta t}$ for the fixed timestep $\Delta t$ according to the following:

$$a_{\Delta t} = \underset{a}{\operatorname{argmin}} \left\| \begin{bmatrix} \dfrac{1}{t_1 + \Delta t/2} \\ \dfrac{1}{t_2 + \Delta t/2} \\ \vdots \\ \dfrac{1}{t_k + \Delta t/2} \end{bmatrix} a - \begin{bmatrix} \dfrac{g(t_1 + \Delta t) - g(t_1)}{\Delta t} \\ \dfrac{g(t_2 + \Delta t) - g(t_2)}{\Delta t} \\ \vdots \\ \dfrac{g(t_k + \Delta t) - g(t_k)}{\Delta t} \end{bmatrix} \right\|_2,$$

where argmin represents a minimization, $t_k$ represents a $k^{th}$ time point, and wherein the constant c corresponding to this timestep is $$c_{\Delta t} = g(T_{end}) - a_{\Delta t} \ln(T_{end}).$$

In another aspect, the system determines a predicted value for a future time $T_{end} + t_d$ according to the following:

$$F_{\Delta t}(t_d) = a_{\Delta t} \ln(T_{end} + t_d) + c_{\Delta t},$$

where $t_d$ is the desired time length for prediction.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
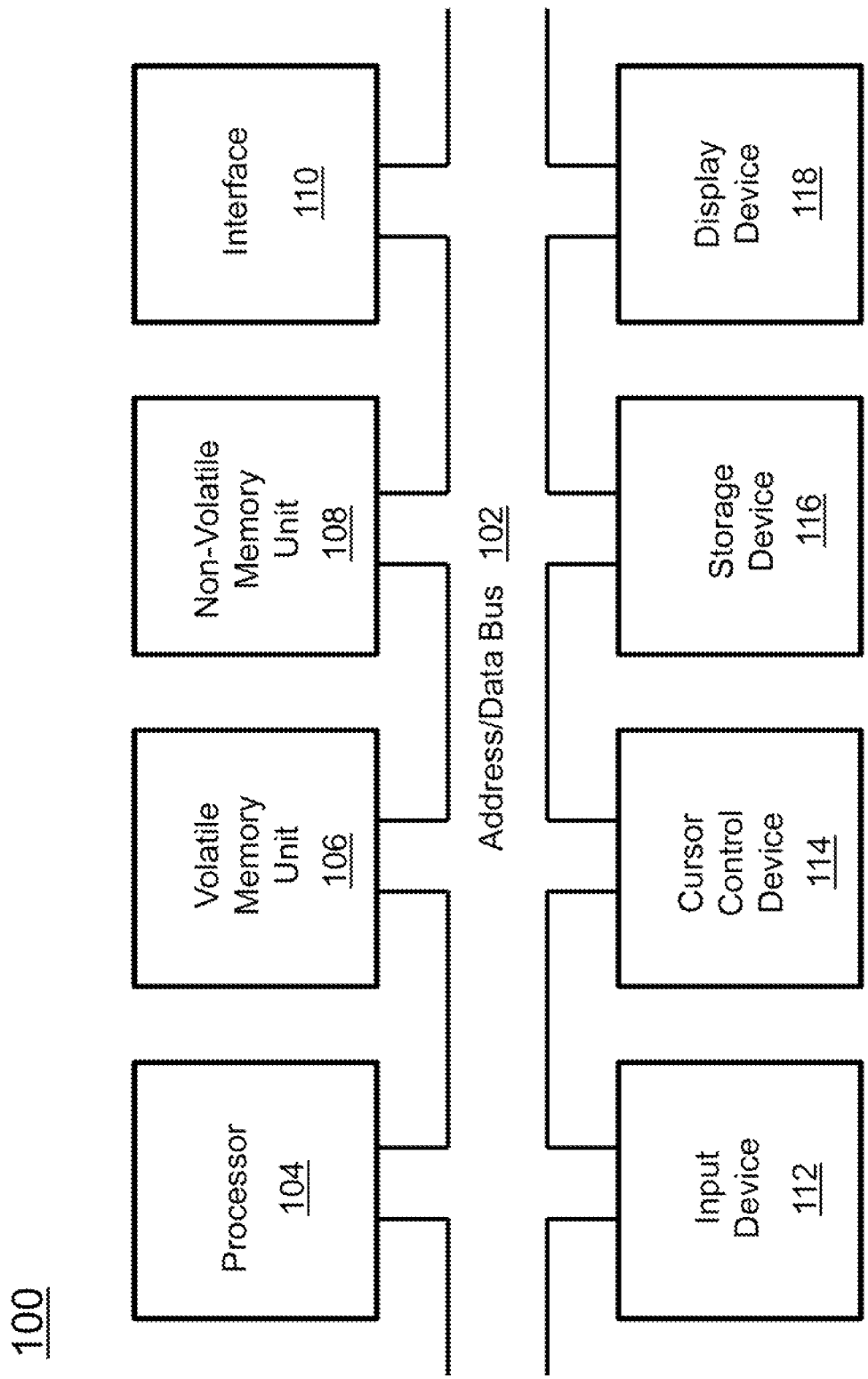
FIG. 1 is a block diagram depicting the components of a system for automated detection of critical transitions system according to the principles of the present invention.

The present invention relates to a system for automated detection of critical transitions and, more particularly, to a system for automated detection of critical transitions using predicted system trajectories.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Subsequently, an introduction provides the reader with a general understanding of the present invention. Finally, specific details of the present invention are provided to give an understanding of the specific aspects.

(1) LIST OF INCORPORATED CITED LITERATURE REFERENCES

The following references are cited throughout this application. For clarity and convenience, the references are listed herein as a central resource for the reader. The following references are hereby incorporated by reference as though fully set forth herein. The references are cited in the application by referring to the corresponding literature reference number.

1. O. Kwon and J.-S. Yang, Information Flow between Stock Indices, 2008 EPL 82 68003.
2. H. Moon and T.-C. Lu, Early Warning Signal of Complex Systems: Network Spectrum and Critical Transitions, WIN 2010.
3. H. Moon and T.-C. Lu, Network Catastrophe: Self-Organized Patterns Reveal both the Instability and the Structure of Complex Networks, preprint, 2012.
4. M. Staniek and K. Lehnertz, Symbolic Transfer Entropy, Physical Review Letters 100, 15801, 2008.
5. M. Scheffer, J. Bascompte, W. A. Brock, V. Brovkin, S. R. Carpenter, V. Dakos, H. Held, E. H. van Nes, M. Rietkerk, and G. Sugihara, Early-warning signals for critical transitions. Nature, 461, 2009.
6. T. Schreiber, Measuring Information Transfer, Phys. Rev, Lett. 85, 461, 2000.

(2) PRINCIPAL ASPECTS

The present invention has three "principal" aspects. The first is a system for automated detection of critical transitions. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
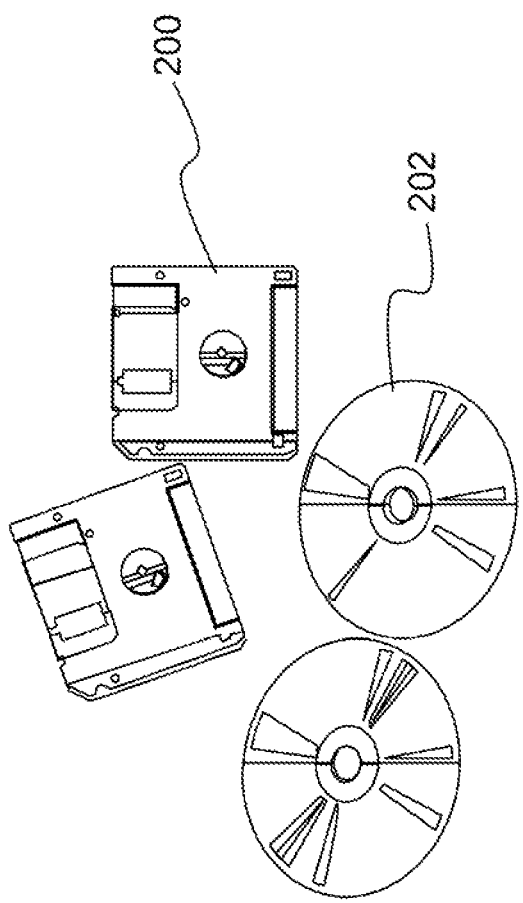
FIG. 2 is an illustration of a computer program product according to the principles of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) INTRODUCTION

One central characteristic of complex social-technological systems is their self-organized emerging interactions which provide the benefits of exchanging information and resources effectively, yet at the same time increase the risk and pace of spreading attacks or failures. A small perturbation on a complex system operating in a high-risk unstable region can induce a critical transition that leads to unstoppable catastrophic failures. In the system according to the principles of the present invention, catastrophic failures can be avoided by detecting early warnings of critical transitions and predicting the likelihood of system trajectories and the lead time to the critical points.

The invention described herein is built upon the invention described in U.S. application Ser. No. 13/904,945, entitled, "Detection and Identification of Directional Influences Using Dynamic Spectrum" (hereinafter referred to as the '945 application), which is an information dynamic spectrum framework that goes beyond unidirectional diffusion dynamics to investigate heterogeneously networked dynamical systems with transient directional influence. The '945 application is hereby incorporated by reference as though fully set forth herein.

The '945 application describes the development of a novel Associative Transfer Entropy (ATE) measure which decomposes the pair-wise directional influence of transfer entropy to associative states of asymmetric, directional information flows. Multivariate time series of complex systems were transformed into the spectrum of Transfer Entropy Matrix (TEM) and Associative Transfer Entropy Matrix (ATEM) to capture information dynamics of the system. The novel spectral radius measures of TEM and ATEM were developed to detect early warning signals of source-driven instability, and induce directional influence structure to identify the source and reveal dynamics of directional influences. The framework described in the '945 application enables one not only to accurately detect, predict, and mitigate abrupt behavior changes in complex systems, but also to understand, design, and build more sustainable and resilient complex systems.

The idea of associative transfer entropy is to decompose transfer entropy (TE) by constraining associated states of two processes. The simplest case of ATE is two influence classes: one positive ATE+ and the other negative ATE−. In this case, ATE is able to distinguish two situations where the amount of information transfer is the same but have opposite effects: the source drives the destination the same direction in ATE+, and the source drives the destination the opposite direction in ATE−. For dynamic data, meaning the amount of information flow is not constant, the TE/ATE of time series in a local time window is calculated, so that TE/ATE becomes a function of time. Such decomposition further enables one to investigate ATEM in the form of ATEM+ and ATEM−.

Given ATE+/TE cross-over signature as the early warning signals of critical transition, the present invention predicts (1) the likelihood of system trajectories and (2) the lead time to critical points. It was first observed that ATE+ and TE are maximized, at the same time that ATE− flattened, prior to the system switching to alternative stable regimes. Therefore, model-based statistical forecasting was applied to estimate the likelihood of ATE+/TE/ATE− trajectories. The lead time is predicted by estimating the critical point based on the projected flattening of ATE− trajectories. The prediction method according to the principles of the present invention will continuously output the update of probabilistic cones as the system progresses. Determining the likelihood and lead time of critical points will enable further developments of a mitigation strategy to avoid critical transitions. Each of these aspects will be described in further detail below.

(4) SPECIFIC DETAILS OF THE INVENTION

Described is a system to address the need of automated detection of emerging transitions, and identify sources of instability from time series of complex systems. The techniques according to the principles of the present invention can be used to detect directional influences apart from intrinsic dynamics so that one can derive encapsulated interaction modules to predict behavior trajectories. The system according to the principles of the present invention will enable the advancement in analyzing dynamics of complex networks.

Advantages of the system and method described herein include, but are not limited to, (1) providing an effective measure for quantifying associative, asymmetric directional influences, whereas other methods only can handle either symmetric or directional influences; (2) providing an effective formulation for capturing system-wise directional influences, whereas other methods can only handle pair-wise directional influence, or system-wise symmetrical influence; (3) providing an effective measure for detecting instability in systems with directional influence dynamics, whereas other methods assume un-directional diffusion dynamics; (4) providing an effective method for characterizing instability trends of aggregated directional influences, whereas other methods can only detect instability with simple thresholding; and (5) providing an effective method to reveal sources and structures in changing dynamics of directional influences, whereas other methods can only handle stationary dynamics.

(4.1) Background: Information Dynamic Spectrum

The asymmetric measure, transfer entropy, $$T_{x_j \to x_i} = \Sigma_{(x_{i,t+1}, x_{i,t}, x_{j,t}) \in D} p(x_{i,t+1}, x_{i,t}, x_{j,t}) \log \frac{p(x_{i,t+1} \mid x_{i,t}, x_{j,t})}{p(x_{i,t+1} \mid x_{i,t})}, \quad (1)$$

quantifies the amount of information transfer from source $x_j$ to destination $x_i$. It has been used to demonstrate the asymmetrical influence from mature markets to emerging markets by analyzing stock market indices, as described in Literature Reference Nos. 1 and 6. Yet, current state-of-the-art only considers average pair-wise information transfers and statistical analysis, without including the more fundamental object of an information dynamic spectrum (i.e., time-varying information transfer) to explain the emergence of directional influences.

In the previously developed information dynamic spectrum theory described in the '945 application, the dynamics of a complex network were formulated as: $dX=F(X)dt+\sigma dW$, where $F: \mathbb{R}^m \rightarrow \mathbb{R}^m$ is a differentiable function that explains the dynamics of the system of m elements $X(t) = [x_1(t)\ x_2(t)\ \ldots\ x_m(t)]^T$ and is defined by $F(X(t)) = [f_1(X(t))\ f_2(X(t))\ \ldots\ fm(X(t))]^T$. This captures both the dynamics of individual entities and the networked interactions between the entities. For example, element $x_i(t)$ can be the $i^{th}$ stock index of the $t^{th}$ trading day. The last term, $\sigma dW$, corresponds to white noise scaled by a. To reveal the unknown $F(X)$, this problem is further simplified by linear approximation: $F(X) \approx F(X_0) + J(X_0)(X-X_0)$, for X near $X_0$, where $$J = \left[\frac{\partial f_i}{\partial x_j}\right]_{i,j=1,\ldots m}$$

is the Jacobian matrix. Therefore, the local temporal dynamics can be obtained pair-wise. The measure associative transfer entropy (ATE) at state $D_k$, for $i \neq j$ is defined by:

$$T^{D_k}_{x_j \rightarrow x_i} = \Sigma_{(x_{i,t+1},x_{i,t},x_{j,t}) \in D} p(x_{i,t+1}, x_{i,t}, x_{j,t}) \log \frac{p(x_{i,t+1}|x_{i,t},x_{j,t})}{p(x_{i,t+1}|x_{i,t})}, \quad (2)$$

where $D_k$ is a subset of D that represents a certain associated state between $x_i$ and $x_j$. $\Sigma$ represents a summation, t represents a unit of time, p represents a probability of associative influence, and | represents a conditional probability. The purpose of ATE is to capture information transfer between two variables, such as states of a motor vehicle electronic component, for a particular state association. For example, TE may be decomposed into two influence classes: one positive and the other negative.

If the internal dynamics within each node is negligible comparing to interactions among nodes, it is conjectured that $$\frac{\partial f_i}{\partial x_j} \sim g(T^{D_1}_{x_j \rightarrow x_i}, T^{D_2}_{x_j \rightarrow x_i}, \ldots, T^{D_s}_{x_j \rightarrow x_i}),$$

for some linear function g. Let $T^{D_k}$ be an associative transfer entropy matrix (ATEM):

$$T^{D_k} = \begin{bmatrix} T^{D_k}_{x_1 \rightarrow x_1} & T^{D_k}_{x_2 \rightarrow x_1} & \ldots & T^{D_k}_{x_m \rightarrow x_1} \\ T^{D_k}_{x_1 \rightarrow x_2} & T^{D_k}_{x_2 \rightarrow x_2} & \ldots & T^{D_k}_{x_m \rightarrow x_2} \\ & & \vdots & \\ T^{D_k}_{x_1 \rightarrow x_m} & T^{D_k}_{x_2 \rightarrow x_m} & \ldots & T^{D_k}_{x_m \rightarrow x_m} \end{bmatrix}. \quad (3)$$

To appropriately deal with dynamic data, meaning the amount of information flow from one to another is not static, TE/ATE curves were generated as functions of time, calculated over sliding windows.

Since the TEM matrix is non-symmetric, its eigenvalues are complex-valued. The spectral radius of the TEM matrix is used to measure the total amount of information flow of the entire network.

To efficiently estimate transfer entropy of continuous data, Staniek and Lehnertz (see Literature Reference No. 4) proposed a method using a symbolization technique that is robust and computationally fast, which had been introduced with the concept of permutation entropy. In the '945 application, the symbolization technique of Staniek and Lehnertz was adapted to calculate ATE. Specifically, the continuous-valued time sequence $\{x(t)\}_{t=1}^N$ was symbolized by first ordering the values of $\{x(t), x(t+1), \ldots x(t+m)\}$ with $\{1, 2, \ldots, m\}$ and denoting $\hat{x}(t)$=associated permutation of order m the symbol of x(t) at t. Then, the ATE of $\{x(t)\}_{t=1}^N$ is estimated by calculating ATE of $\{(\hat{x}(t)\}_{t=1}^N$.

Figure 3:
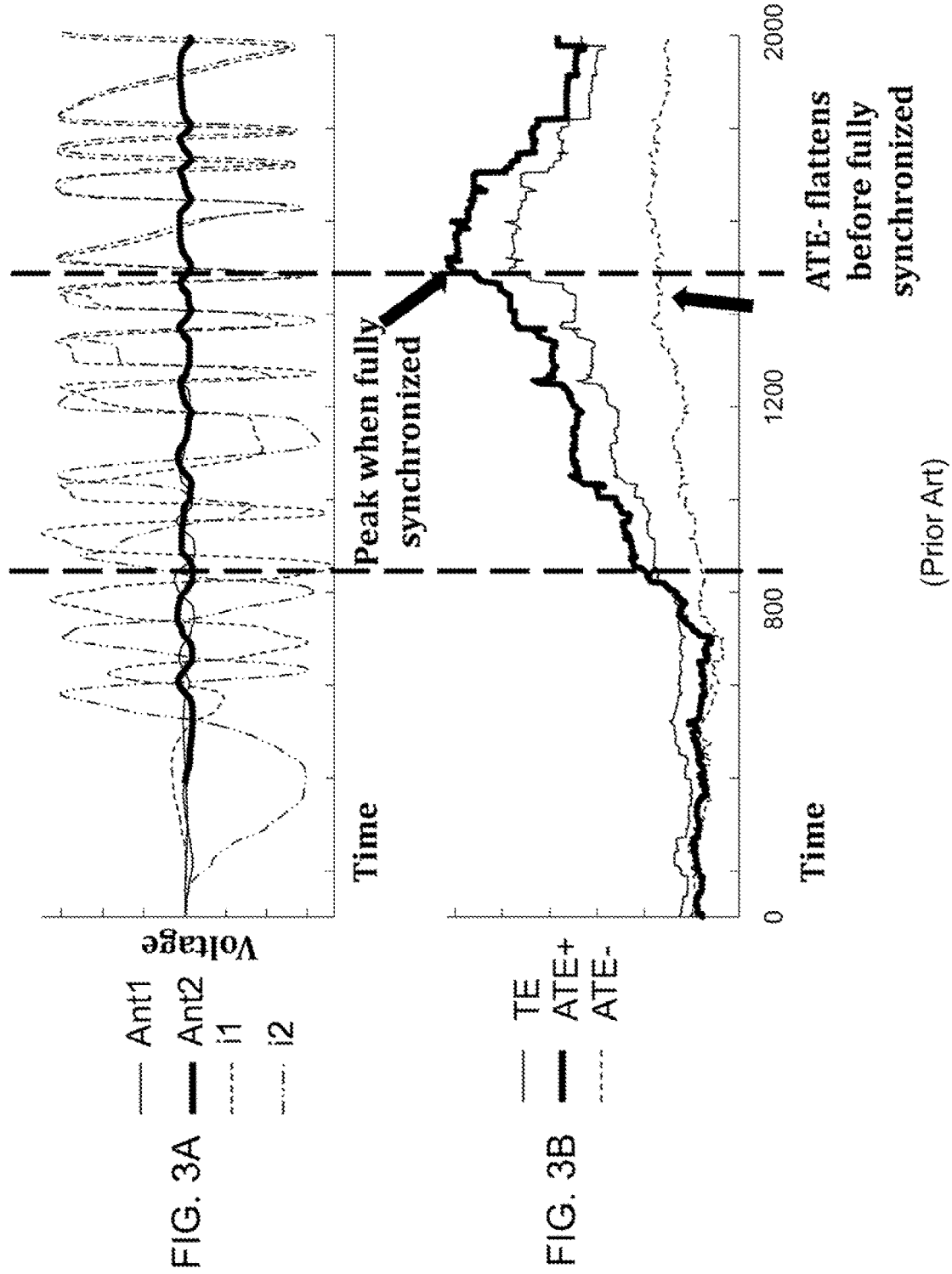
FIG. 3A illustrates a non-foster circuit in voltage over time according to prior art.
FIG. 3B illustrates transfer entropy (TE)/associative transfer entropy (ATE)+/ATE− curves over time according to prior art.

FIGS. 3A and 3B show an ATE analysis of a non-foster network from the invention described in the '945 application. The circuit is initially operated in the stable region, where there is no oscillation. Then a small perturbation is added. It is unknown whether the circuit will become oscillatory (unstable) or stay stable. An ATE analysis was performed to detect if the circuits would become synchronized (unstable). The plot in FIG. 3A is the circuit in voltage over time, where Ant1 represents Antenna 1, Ant2 represents Antenna 2, i1 represents port 1, and i2 represents port 2. The plot in FIG. 3B shows the TE/ATE+/ATE− curves over time. The curves are obtained from the absolute sum of spectrum of TEM/ATEM+/ATEM−, respectively. It was found that the spectral radius of TEM/ATEM+/ATEM− also show similar outcomes, but since TEM is the sum of ATEM+ and ATEM−, the ATE+ curve will never cross the TE curve. Thus, the absolute sum of the spectrum is more informative. As shown in FIG. 3B, the ATE+ curve crosses over the TE curve near time point 800, indicating the increasing in synchronization. In addition, the ATE+ curve reaches its peak right before full synchronization, while the ATE− curve flattens because there is no negative association.

(4.2) Probabilistic Cones for Trajectories Prediction

In the system according to the principles of the present invention, model-based statistical forecasting is used to estimate the TE/ATE+/ATE− trajectories. An advantage of analyzing the TE/ATE curves is that TE/ATE removes the spikes of the raw data, as shown in the circuit data example in FIG. 3A. It has been observed that the TE curve in this case can be well approximated by the natural logarithm with an unknown coefficient a and a constant c according to the following:

$$g(t) = a\ \ln(t) + c. \quad (4)$$

Figure 4:
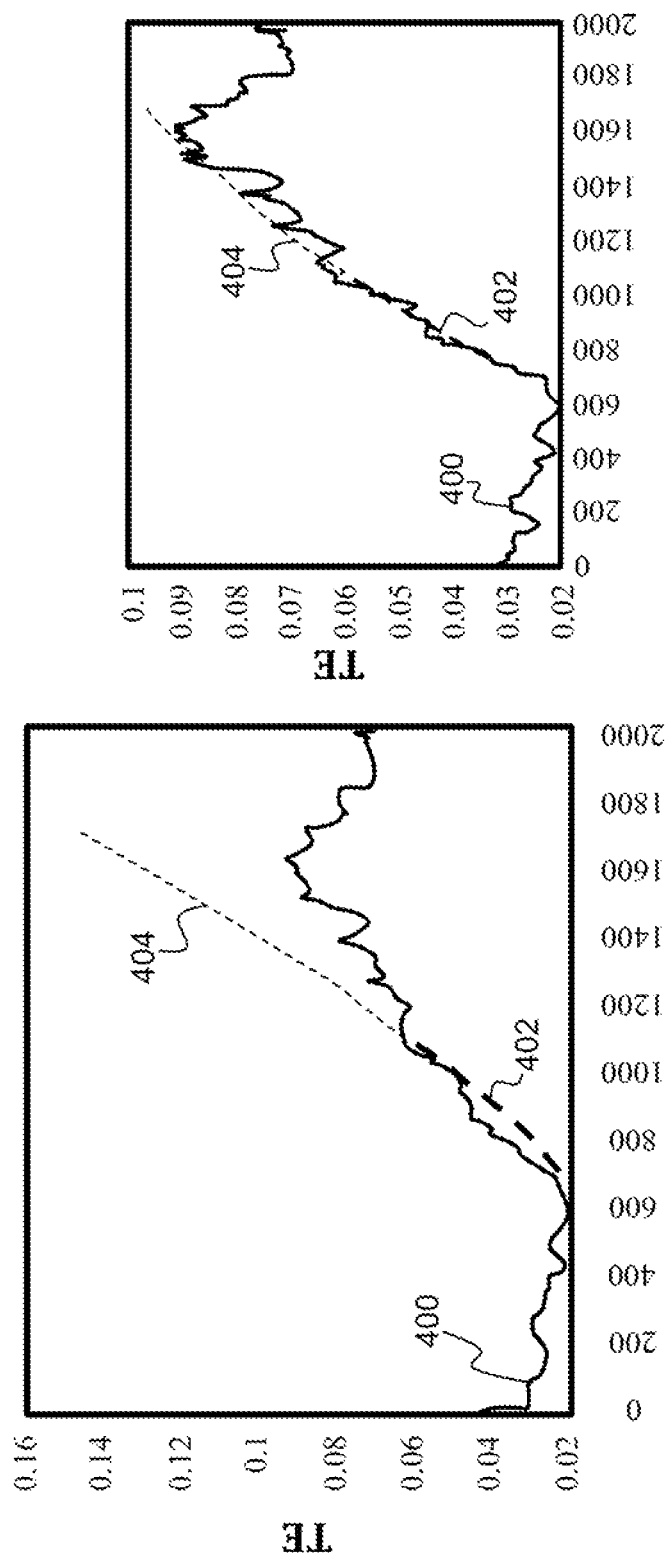
FIG. 4A illustrates curve fitting with a plot of the exponential function according to the principles of the present invention.
FIG. 4B illustrates curve fitting with a plot of the logarithmic function according to the principles of the present invention.

FIG. 4A shows curve fitting with a plot of the exponential function, and FIG. 4B illustrates curve fitting with a plot of the logarithmic function. The bold solid curves 400 are the TE curve from FIG. 3B. The bold dashed curves 402 are the fitted curves in the interval $t \in [700, 1100]$. The unbolded dashed curves 404 are the projections from the fitted curves. FIG. 4B shows that the logarithm is appropriate to fit the TE curve.

To estimate the coefficient a from TE/ATE+ curves, instead of fitting them deterministically with the logarithmic function in equation (4), the rate of change was estimated with various discrete time steps. This generates a prediction cone, which will be described in detail below. From the derivative of equation (4), $$g'(t) = \frac{a}{t}, \quad (5)$$

the following discretized version for the unknown a was obtained:

$$\frac{\Delta g}{\Delta t} = a\frac{1}{t}. \quad (6)$$

For a fixed timestep $\Delta t$ in a window $[T_{start}, T_{end}]$, the least squares was used to solve the unknown a. First, the following matrix equation was written:

$$\begin{bmatrix} \frac{1}{t_1 + \Delta t/2} \\ \frac{1}{t_2 + \Delta t/2} \\ \vdots \\ \frac{1}{t_k + \Delta t/2} \end{bmatrix} a = \begin{bmatrix} \frac{g(t_1 + \Delta t) - g(t_1)}{\Delta t} \\ \frac{g(t_2 + \Delta t) - g(t_2)}{\Delta t} \\ \vdots \\ \frac{g(t_k + \Delta t) - g(t_k)}{\Delta t} \end{bmatrix}, \quad (7)$$

where $t_1, \ldots, t_k + \Delta t \in [T_{start}, T_{end}]$, where $t_k$ is the $k^{th}$ time point. The approximation of $a_{\Delta t}$ for the fixed timestep $\Delta t$ was then obtained according to the following:

$$a_{\Delta t} = \underset{a}{\mathrm{argmin}} \left\| \begin{bmatrix} \frac{1}{t_1 + \Delta t/2} \\ \frac{1}{t_2 + \Delta t/2} \\ \vdots \\ \frac{1}{t_k + \Delta t/2} \end{bmatrix} a - \begin{bmatrix} \frac{g(t_1 + \Delta t) - g(t_1)}{\Delta t} \\ \frac{g(t_2 + \Delta t) - g(t_2)}{\Delta t} \\ \vdots \\ \frac{g(t_k + \Delta t) - g(t_k)}{\Delta t} \end{bmatrix} \right\|_2. \quad (8)$$

The constant corresponding to this timestep is then $c_{\Delta t} = (T_{end}) - a_{\Delta t} \ln(T_{end})$. Therefore, the predicted value for the future time $T_{end} + t_d$ is $$F_{\Delta t}(t_d) = a_{\Delta t} \ln(T_{end} + t_d) + c_{\Delta t} \quad (9)$$

$t_d$ is the desired time length for prediction.

Now that a method to estimate the constants c and a has been established, a probabilistic prediction cone (or light cone) can be generated at each time point as one varies $\Delta t$ to obtain multiple estimates of c and a. Therefore, a probabilistic prediction cone at a given time consists of a collection of natural logarithm curves starting from that point.

To estimate the error of this prediction for the immediate next timestep, the following was calculated:

$$\mathrm{error}_{\Delta t}(i) = g(t_i + \Delta t) - [a_{\Delta t} \ln(t_i + \Delta t) + c(i)], \quad (10)$$

where $$c(i) = g(t_{i-1}) - a_{\Delta t} \ln(t_{i-1}). \quad (11)$$

Let E be the collection of all $\mathrm{error}_{\Delta t}$ over all timesteps $\Delta t$ and let $\sigma$=standard deviation of E. Let G be the collection of all predicted values $G_{\Delta t}(t_d)$ over all timesteps $\Delta t$ and $\mu$=mean (G). Therefore, the 95% confidence interval for the future time $T_{end} + t_d$ is:

$$CI = \left[ \mu - 1.96 \frac{\sigma}{\sqrt{N}}, \mu + 1.96 \frac{\sigma}{\sqrt{N}} \right], \quad (12)$$

where N is the size of E.

Figure 5:
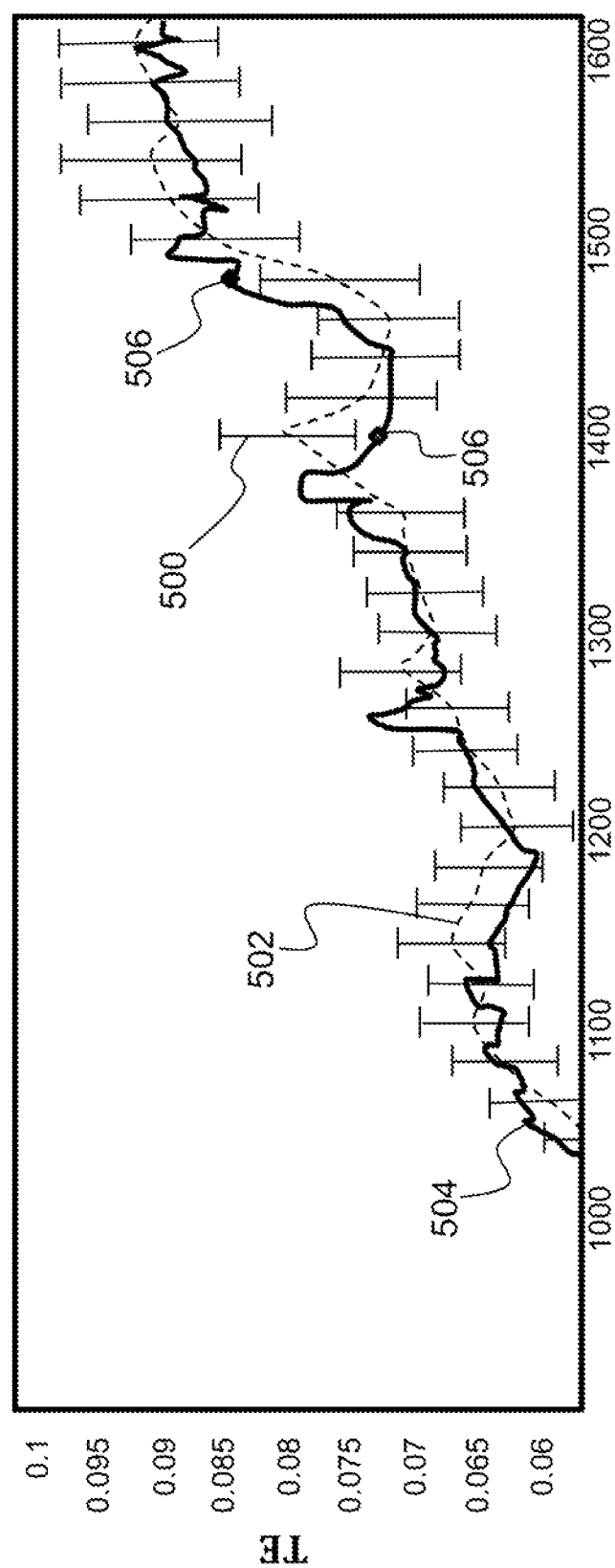
FIG. 5 is a plot comparing an actual trajectory to a predicted trajectory according to the principles of the present invention.

FIG. 5 shows the 95% confidence interval of a predicted trajectory in unbolded solid lines 500. The predicted trajectory for TE is represented by the unbolded dashed line 502. The bold solid line 504 depicts the actual trajectory of TE. The prediction value and confidence interval are generated from the prediction cones, described above. Two points of the actual trajectory were outside the 95% confidence interval, right before the non-foster circuits were fully synched around time t=1500. These points are represented by diamonds 504 and indicate the possibility of a trend toward a critical transition.

Figure 6A:
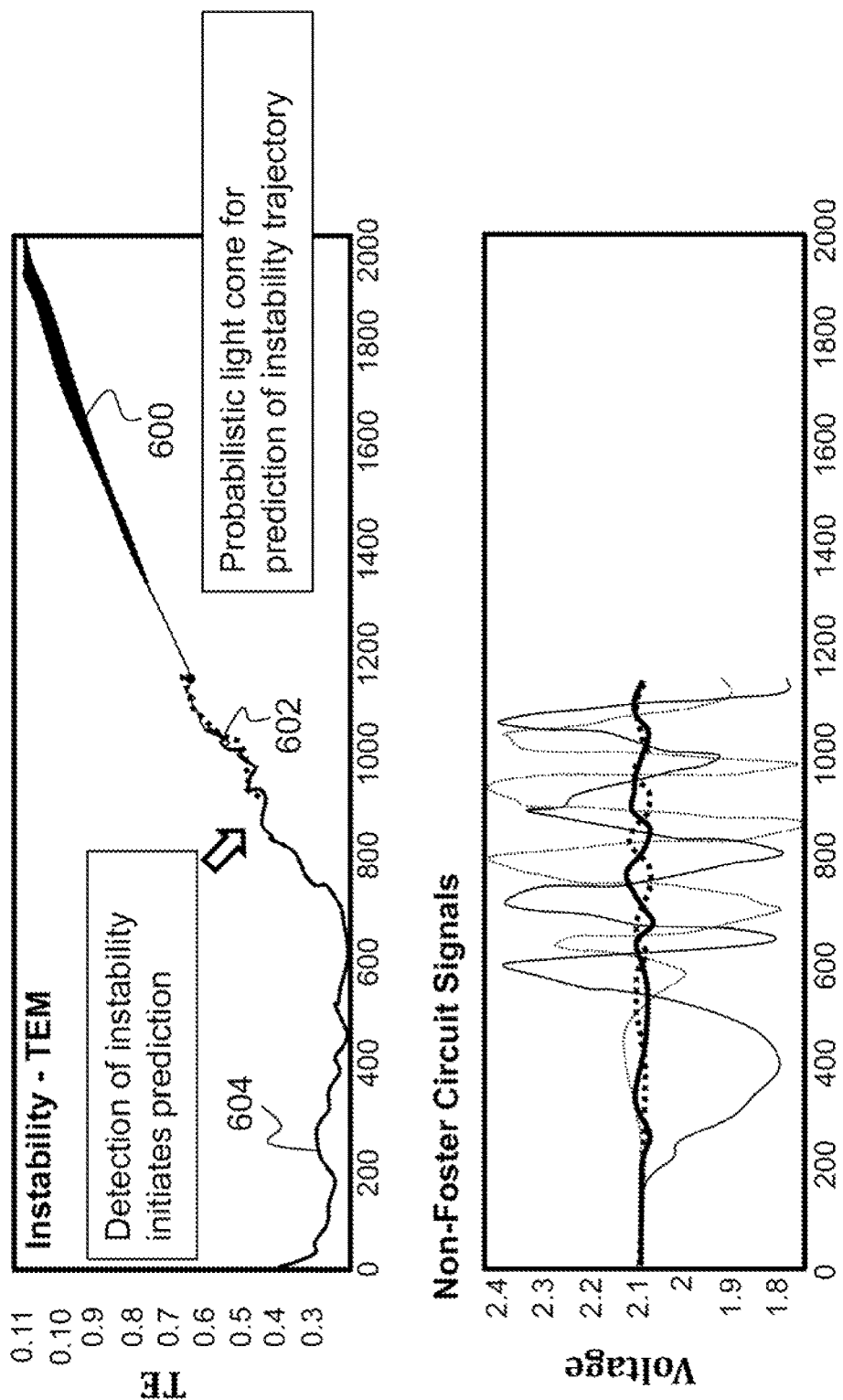
FIG. 6A illustrates a prediction cone produced according to the principles of the present invention and the predicted trajectory.
Figure 6B:
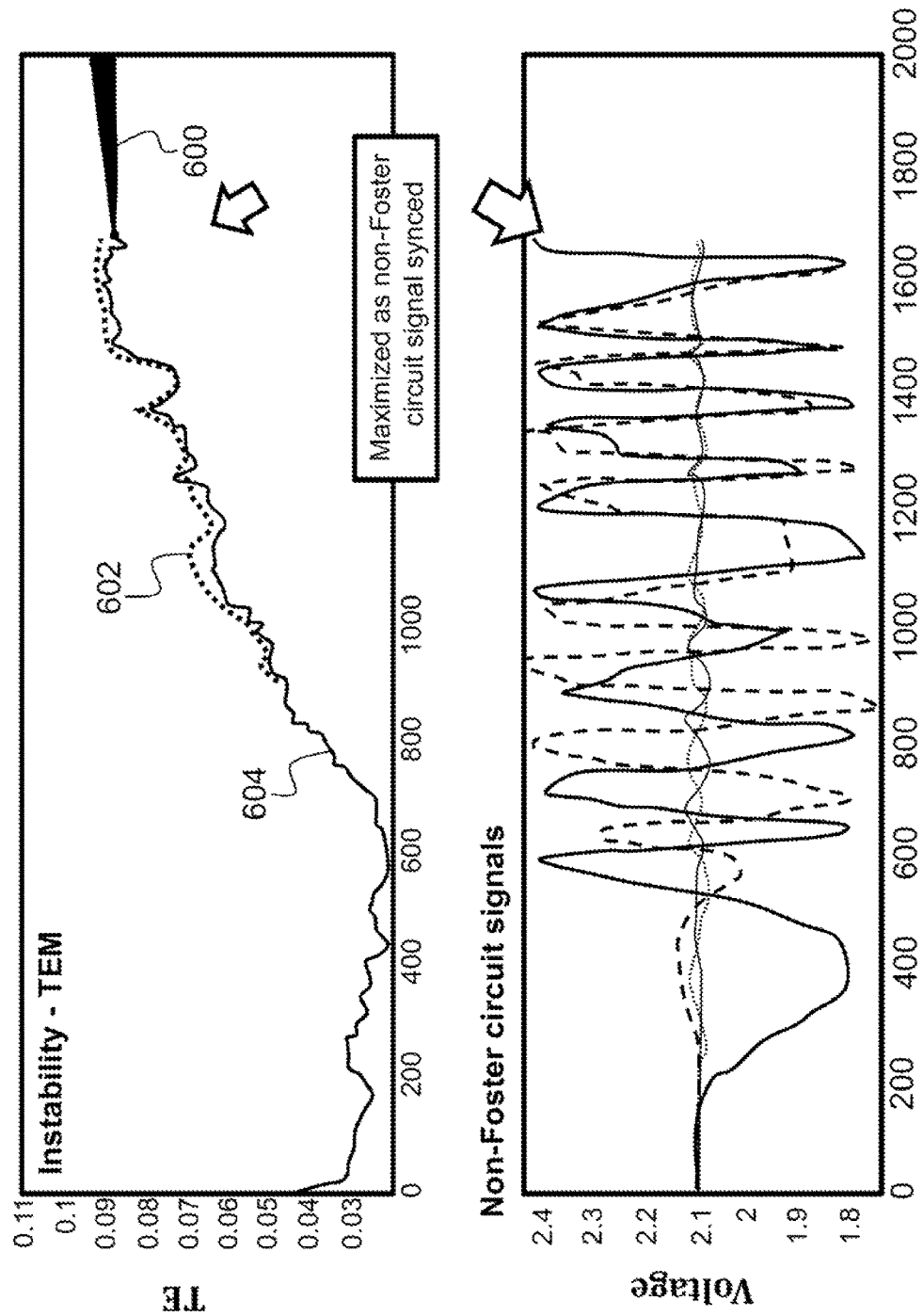
FIG. 6B illustrates a prediction cone produced according to the principles of the present invention and the predicted trajectory.

FIGS. 6A and 6B illustrate two time snapshots of the prediction cones 600 produced according to the method described above and the predicted trajectory value (represented by bold dashed curves 602). The prediction cones are used to generate the prediction values with confidence intervals in FIG. 5. The solid bold curves 604 represent the actual TE trajectory.

Figure 7:
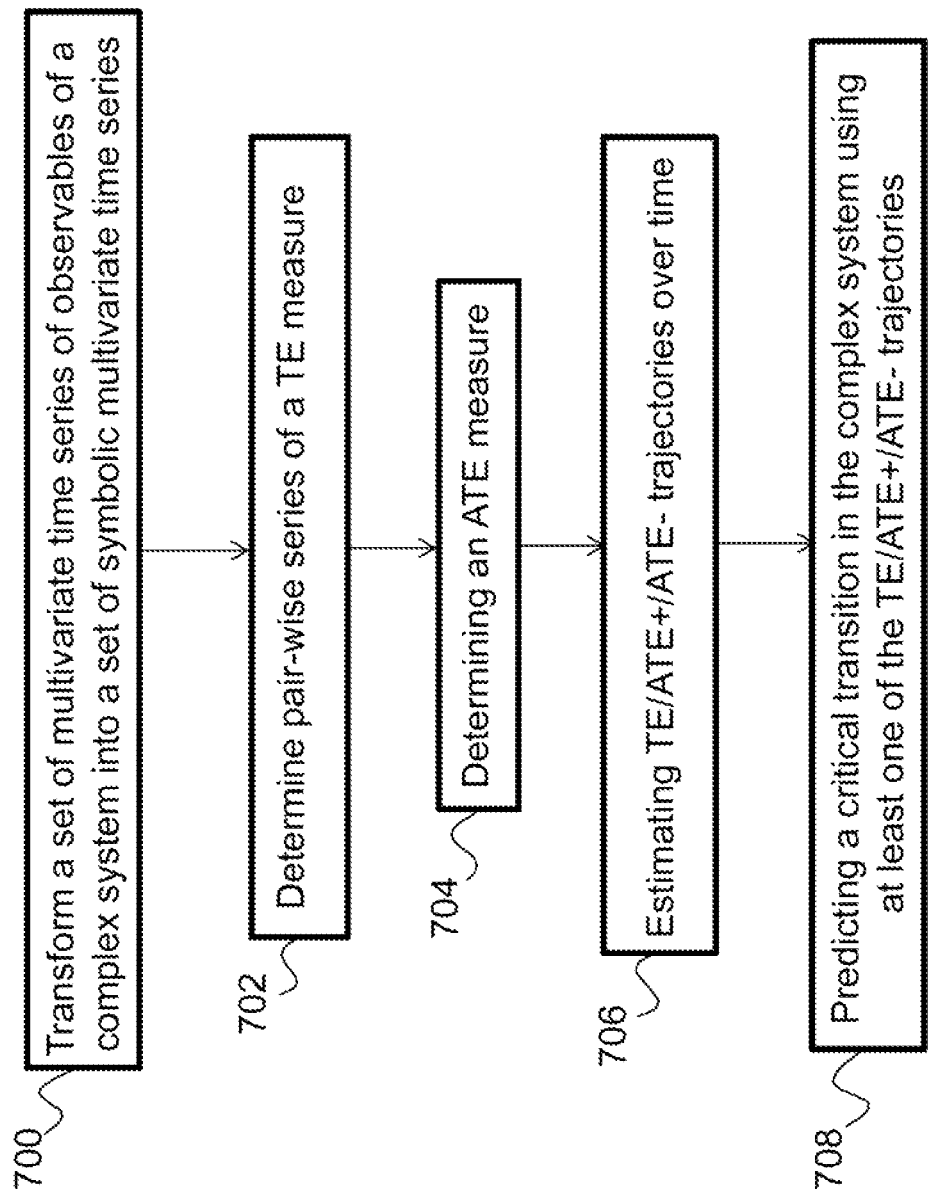
FIG. 7 is a flow diagram depicting a system for automated detection of critical transitions according to the principles of the present invention.

FIG. 7 is a flow diagram depicting the system for predicting system trajectories toward critical transitions according to the principles of the present invention. In a first step 700, a set of multivariate time series of observables of a complex system is transformed into a set of symbolic multivariate time series. In a second step 702, the system determines pair-wise time series of a TE measure. In a third step 704, an ATE measure is determined. In a fourth step 706, the system estimates ATE+, TE, and ATE- trajectories over time. In a fifth step 708, a critical transition in the system is predicted using at least one of the ATE+, TE, and ATE- trajectories.

In summary, the present invention is a system and method for analyzing time series of complex systems to detect trends toward critical transitions, especially for complex systems with directional influence dynamics. The described system and method can be deployed as embedded decision support modules to provide early indication of critical transitions in complex systems, including, but not limited to, motor vehicle health management, prognostics for complex electronics, crisis management in supply chains, social unrests, financial market instability, and epileptic seizures in brain networks. The technology described herein will result in accurate detection of upcoming critical transitions of system behaviors, accurate characterization of instability trends toward critical transitions, and accurate identification of instability sources and propagation structure changes. Applications of the present invention included, but are not limited to, motor vehicle health management, complex electronics, smart power grid, social network analysis, social instability, supply-chain crisis management, cyber security, and epileptic seizure detection.

As is understood by one skilled in the art, a motor vehicle is comprised of complex electronics, some of which function to provide information related to the motor vehicle's health. A motor vehicle's health pertains to its normal operating condition, and a motor vehicle includes multiple electronic components that function to keep the motor vehicle in its normal operating condition. A non-limiting example of an electronic component related to a vehicle's health is a battery cell, and, as can be appreciated by one skilled in the art, the health of the battery cell can be determined by measuring voltage and current of the battery cell. Thus, if the time series of observables are time series of battery cell voltages and currently, then the system described herein can monitor changing directional influences in the battery cell over time to detect potential malfunctions.

Additionally, as would be known by one skilled in the art, prognostics for complex electronics, such as motor vehicles, would include some type of alert, either visual or audible, to alert a user of the potential malfunction in a vehicle health component. For instance, if the voltage of a battery cell is lower than a predetermined threshold for normal operating function, an alert can be provided via a vehicle dashboard indicator, referred to as an idiot light, with or without a corresponding audio alert. As understood by one skilled in the art, an idiot light is an indicator of malfunction of a system within a motor vehicle by an illuminated symbol or text (see https://en.wikipedia.org/wiki/Idiot_light, which cites an article in Popular Mechanics, published in January 1984, describing an idiot light).

What is claimed is:

1. A system for predicting critical transitions, the system comprising:
   an electronic circuit having a plurality of components, each component having a time series of voltage measurements; and
   one or more processors and a non-transitory computer-readable medium having executable instructions encoded thereon such that when executed, the one or more processors perform operations of:
   transforming the time series of voltage measurements from the plurality of components of the electronic circuit into a set of symbolic multivariate time series;
   determining a transfer entropy (TE) measure between two time series in the set of symbolic multivariate time series over a sliding time window;
   determining an associative transfer entropy (ATE) measure, wherein the ATE measure is comprised of an ATE+ positive influence class and an ATE− negative influence class, and wherein the ATE measure captures information transfer for a state association $D_K$ between a variable $x_j$ and a variable $x_i$, for $i \neq j$ according to the following:

$$T^{D_k}_{x_j \to x_i} = \sum_{(x_{i,t+1}, x_{i,t}, x_{j,t}) \in D_k} p(x_{i,t+1}, x_{i,t}, x_{j,t}) \log \frac{p(x_{i,t+1} | x_{i,t}, x_{j,t})}{p(x_{i,t+1} | x_{i,t})},$$

where $\Sigma$ represents a summation, t represents a unit of time, p represents a joint probability of the variables, and | represents a conditional probability, wherein the variables $x_j$ and $x_i$ represent states of at least one component of the electronic circuit;
   estimating ATE+, TE, and ATE− trajectories over time; and
   based on the estimated ATE+, TE, and ATE− trajectories, predicting instability in the electronic circuit.

2. The system as set forth in claim 1, wherein the one or more processors further perform an operation of estimating the TE trajectory by the natural logarithm (ln) with an unknown coefficient a and a constant c according to the following:

$$g(t) = a \ln(t) + c,$$

where g(t) represents the estimated TE trajectory, and where t represents time.

3. The system as set forth in claim 2, wherein the one or more processors further perform an operation of estimating the unknown coefficient a with various discrete time steps by taking the derivative of $g(t) = a \ln(t) + c$ to obtain $$g'(t) = \frac{a}{t},$$

then obtaining a discretized version of the unknown coefficient a according to the following:

$$\frac{\Delta g}{\Delta t} = a \frac{1}{t}.$$

4. The system as set forth in claim 3, wherein the one or more processors further perform an operation of determining the unknown coefficient a according to the following:
   for a fixed timestep $\Delta t$ in a window $[T_{start}, T_{end}]$, determining the following matrix equation:

$$\begin{bmatrix} \frac{1}{t_1 + \Delta t/2} \\ \frac{1}{t_2 + \Delta t/2} \\ \vdots \\ \frac{1}{t_k + \Delta t/2} \end{bmatrix} a = \begin{bmatrix} \frac{g(t_1 + \Delta t) - g(t_1)}{\Delta t} \\ \frac{g(t_2 + \Delta t) - g(t_2)}{\Delta t} \\ \vdots \\ \frac{g(t_k + \Delta t) - g(t_k)}{\Delta t} \end{bmatrix},$$

where $t_1, \ldots, t_k + \Delta t \in [T_{start}, T_{end}]$; and
determining an approximation of $a_{\Delta t}$ for the fixed timestep $\Delta t$ according to the following:

$$a_{\Delta t} = \operatorname*{argmin}_{a} \left\| \begin{bmatrix} \frac{1}{t_1 + \Delta t/2} \\ \frac{1}{t_2 + \Delta t/2} \\ \vdots \\ \frac{1}{t_k + \Delta t/2} \end{bmatrix} a - \begin{bmatrix} \frac{g(t_1 + \Delta t) - g(t_1)}{\Delta t} \\ \frac{g(t_2 + \Delta t) - g(t_2)}{\Delta t} \\ \vdots \\ \frac{g(t_k + \Delta t) - g(t_k)}{\Delta t} \end{bmatrix} \right\|_2,$$

where $\operatorname{argmin}_a$ represents a minimization, $t_k$ represents a $k^{th}$ timestep, and wherein the constant c corresponding to this timestep is $$c_{\Delta t} = g(T_{end}) - a_{\Delta t} \ln(T_{end}).$$

5. The system as set forth in claim 4, wherein the one or more processors further perform an operation of determining a predicted value for a future time $T_{end} + t_d$ according to the following:

$$F_{\Delta t}(t_d) = a_{\Delta t} \ln(T_{end} + t_d) + c_{\Delta t},$$

where $F_{\Delta t}$ is a predicted value for a future time, and where $t_d$ is a desired time length for prediction.

6. The system as set forth in claim 1, wherein the electronic circuit is a non-foster circuit.

7. A computer-implemented method for predicting critical transitions in an electronic circuit having a plurality of components, comprising an act of:
   causing one or more processors to execute instructions stored on a non-transitory memory such that upon execution, the one or more processors perform operations of:
   transforming time series of voltage measurements from the plurality of components of the electronic circuit into a set of symbolic multivariate time series;
   determining a transfer entropy (TE) measure between two time series in the set of symbolic multivariate time series over a sliding time window;
   determining an associative transfer entropy (ATE) measure, wherein the ATE measure is comprised of an ATE+ positive influence class and an ATE− negative influence class, and wherein the ATE measure captures information transfer for a state association $D_K$ between a variable $x_j$ and a variable $x_i$, for $i \neq j$ according to the following:

$$T_{x_j \to x_i}^{D_k} = \sum_{(x_{i,t+1}, x_{i,t}, x_{j,t}) \in D_k} p(x_{i,t+1}, x_{i,t}, x_{j,t}) \log \frac{p(x_{i,t+1} \mid x_{i,t}, x_{j,t})}{p(x_{i,t+1} \mid x_{i,t})},$$

where $\Sigma$ represents a summation, t represents a unit of time, p represents a joint probability of the variables, and | represents a conditional probability, wherein the variables $x_j$ and $x_i$ represent states of at least one component of the electronic circuit;

estimating ATE+, TE, and ATE− trajectories over time; and based on the estimated ATE+, TE, and ATE− trajectories, predicting instability in the electronic circuit.

8. The method as set forth in claim 7, wherein the one or more processors further perform an operation of estimating the TE trajectory by the natural logarithm (ln) with an unknown coefficient a and a constant c according to the following:

$$g(t) = a \ln(t) + c,$$

where g(t) represents the estimated TE trajectory, and where t represents time.

9. The method as set forth in claim 8, wherein the data processor further performs an operation of estimating the unknown coefficient a with various discrete time steps by taking the derivative of $g(t) = a \ln(t) + c$ to obtain $$g'(t) = \frac{a}{t},$$

then obtaining a discretized version of the unknown coefficient a according to the following:

$$\frac{\Delta g}{\Delta t} = a \frac{1}{t}.$$

10. The method as set forth in claim 9, wherein the data processor further performs an operation of determining the unknown coefficient a according to the following:

for a fixed timestep $\Delta t$ in a window $[T_{start}, T_{end}]$, determining the following matrix equation:

$$\begin{bmatrix} \frac{1}{t_1 + \Delta t/2} \\ \frac{1}{t_2 + \Delta t/2} \\ \vdots \\ \frac{1}{t_k + \Delta t/2} \end{bmatrix} a = \begin{bmatrix} \frac{g(t_1 + \Delta t) - g(t_1)}{\Delta t} \\ \frac{g(t_2 + \Delta t) - g(t_2)}{\Delta t} \\ \vdots \\ \frac{g(t_k + \Delta t) - g(t_k)}{\Delta t} \end{bmatrix},$$

where $t_1, \ldots, t_k + \Delta t \in [T_{start}, T_{end}]$; and determining an approximation of $a_{\Delta t}$ for the fixed timestep $\Delta t$ according to the following:

$$a_{\Delta t} = \underset{a}{\operatorname{argmin}} \left\| \begin{bmatrix} \frac{1}{t_1 + \Delta t/2} \\ \frac{1}{t_2 + \Delta t/2} \\ \vdots \\ \frac{1}{t_k + \Delta t/2} \end{bmatrix} a - \begin{bmatrix} \frac{g(t_1 + \Delta t) - g(t_1)}{\Delta t} \\ \frac{g(t_2 + \Delta t) - g(t_2)}{\Delta t} \\ \vdots \\ \frac{g(t_k + \Delta t) - g(t_k)}{\Delta t} \end{bmatrix} \right\|_2,$$

where $\operatorname{argmin}_a$ represents a minimization, $t_k$ represents a $k^{th}$ timestep, and wherein the constant c corresponding to this timestep is $$c_{\Delta t} = g(T_{end}) - a_{\Delta t} \ln(T_{end}).$$

11. The method as set forth in claim 10, wherein the data processor further performs an operation of determining a predicted value for a future time $T_{end} + t_d$ according to the following:

$$F_{\Delta t}(t_d) = a_{\Delta t} \ln(T_{end} + t_d) + c_{\Delta t},$$

where $F_{\Delta t}$ is a predicted value for a future time, and where $t_d$ is a desired time length for prediction.

12. A computer program product for predicting critical transitions in an electronic circuit having a plurality of components, the computer program product comprising computer-readable instructions stored on a non-transitory computer-readable medium that are executable by a computer having one or more processors for causing the one or more processors to perform operations of:

transforming time series of voltage measurements from the plurality of components of the electronic circuit into a set of symbolic multivariate time series;

determining a transfer entropy (TE) measure between two time series in the set of symbolic multivariate time series over a sliding time window;

determining an associative transfer entropy (ATE) measure, wherein the ATE measure is comprised of an ATE+ positive influence class and an ATE− negative influence class, and wherein the ATE measure captures information transfer for a state association $D_K$ between a variable $x_j$ and a variable $x_i$, for $i \neq j$ according to the following:

$$T_{x_j \to x_i}^{D_k} = \sum_{(x_{i,t+1}, x_{i,t}, x_{j,t}) \in D_k} p(x_{i,t+1}, x_{i,t}, x_{j,t}) \log \frac{p(x_{i,t+1} \mid x_{i,t}, x_{j,t})}{p(x_{i,t+1} \mid x_{i,t})},$$

where $\Sigma$ represents a summation, t represents a unit of time, p represents a joint probability of the variables, and | represents a conditional probability, wherein the variables $x_j$ and $x_i$ represent states of at least one component of the electronic circuit;

estimating ATE+, TE, and ATE− trajectories over time; and based on the estimated ATE+, TE, and ATE− trajectories, predicting instability in the electronic circuit.

13. The computer program product as set forth in claim 12, further comprising instructions for causing the processor to perform an operation of estimating the TE trajectory by the natural logarithm (ln) with an unknown coefficient a and a constant c according to the following:

$$g(t) = a \ln(t) + c,$$

where g(t) represents the estimated TE trajectory, and where t represents time.

14. The computer program product as set forth in claim 13, further comprising instructions for causing the processor to perform an operation of estimating the unknown coefficient a with various discrete time steps by taking the derivative of $g(t) = a \ln(t) + c$ to obtain $$g'(t) = \frac{a}{t},$$

then obtaining a discretized version of the unknown coefficient a according to the following:

$$\frac{\Delta g}{\Delta t} = a\frac{1}{t}.$$

15. The computer program product as set forth in claim 14, further comprising instructions for causing the processor to perform an operation of determining the unknown coefficient a according to the following:

for a fixed timestep $\Delta t$ in a window $[T_{start}, T_{end}]$, determining the following matrix equation:

$$\begin{bmatrix} \frac{1}{t_1 + \Delta t/2} \\ \frac{1}{t_2 + \Delta t/2} \\ \vdots \\ \frac{1}{t_k + \Delta t/2} \end{bmatrix} a = \begin{bmatrix} \frac{g(t_1 + \Delta t) - g(t_1)}{\Delta t} \\ \frac{g(t_2 + \Delta t) - g(t_2)}{\Delta t} \\ \vdots \\ \frac{g(t_k + \Delta t) - g(t_k)}{\Delta t} \end{bmatrix},$$

where $t_1, \ldots, t_k + \Delta t \in [T_{start}, T_{end}]$; and
determining an approximation of $a_{\Delta t}$ for the fixed timestep $\Delta t$ according to the following:

$$a_{\Delta t} = \underset{a}{\operatorname{argmin}} \left\| \begin{bmatrix} \frac{1}{t_1 + \Delta t/2} \\ \frac{1}{t_2 + \Delta t/2} \\ \vdots \\ \frac{1}{t_k + \Delta t/2} \end{bmatrix} a - \begin{bmatrix} \frac{g(t_1 + \Delta t) - g(t_1)}{\Delta t} \\ \frac{g(t_2 + \Delta t) - g(t_2)}{\Delta t} \\ \vdots \\ \frac{g(t_k + \Delta t) - g(t_k)}{\Delta t} \end{bmatrix} \right\|_2,$$

where $\operatorname{argmin}_a$ represents a minimization, $t_k$ represents a $k^{th}$ time point, and wherein the constant c corresponding to this timestep is $$c_{\Delta t} = g(T_{end}) - a_{\Delta t} \ln(T_{end}).$$

16. The computer program product as set forth in claim 15, further comprising instructions for causing the processor to perform an operation of determining a predicted value for a future time $T_{end} + t_d$ according to the following:

$$F_{\Delta t}(t_d) = a_{\Delta t} \ln(T_{end} + t_d) + c_{\Delta t},$$

where $F_{\Delta t}$ is a predicted value for a future time, and where $t_d$ is a desired time length for prediction.

* * * * *